Figure 1:
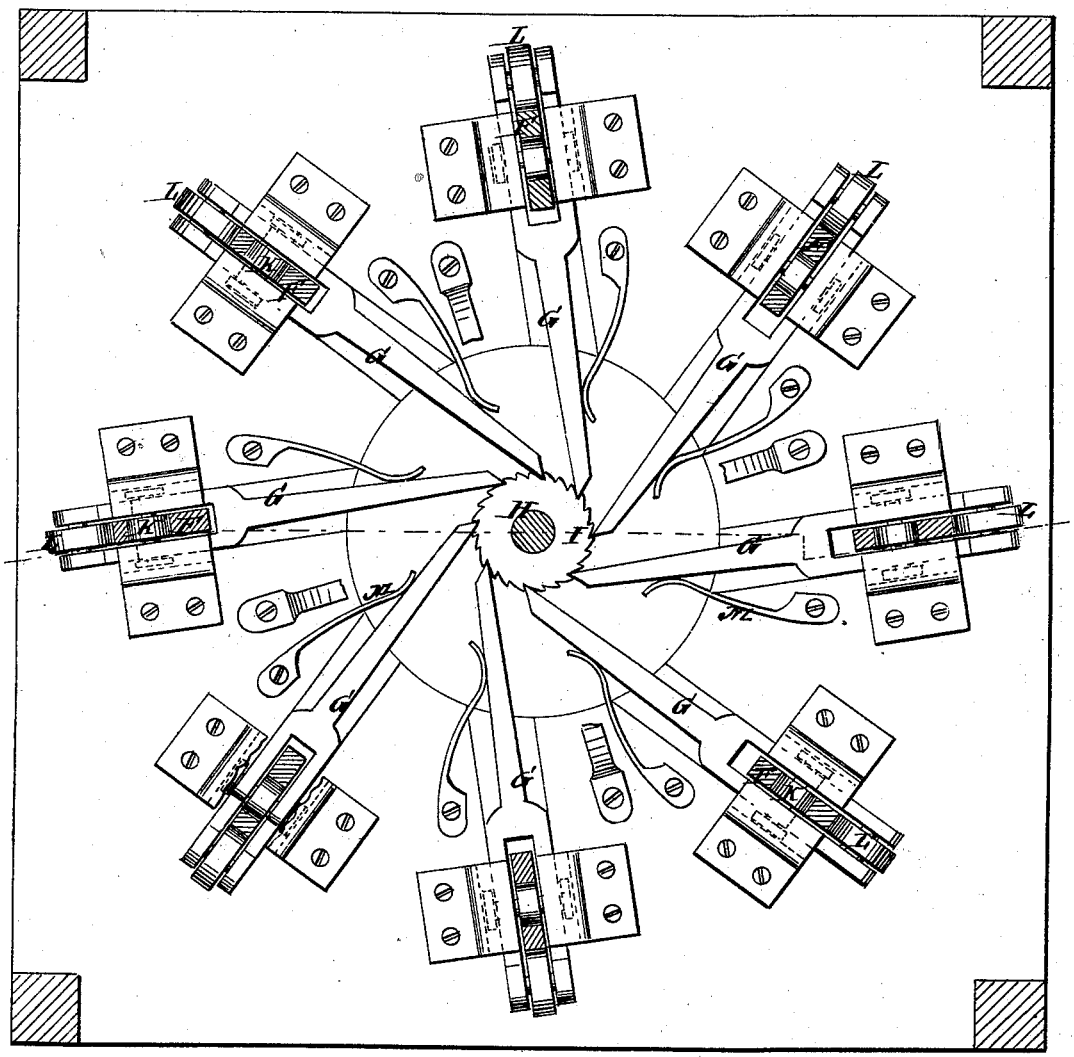

P. B. GREENE.
Motive-Power.

No. 166,271.

2 Sheets--Sheet 1.

Patented Aug. 3, 1875.

WITNESSES:
E. Wolff
N. F. Terry

INVENTOR:
P. B. Greene
BY
ATTORNEYS.

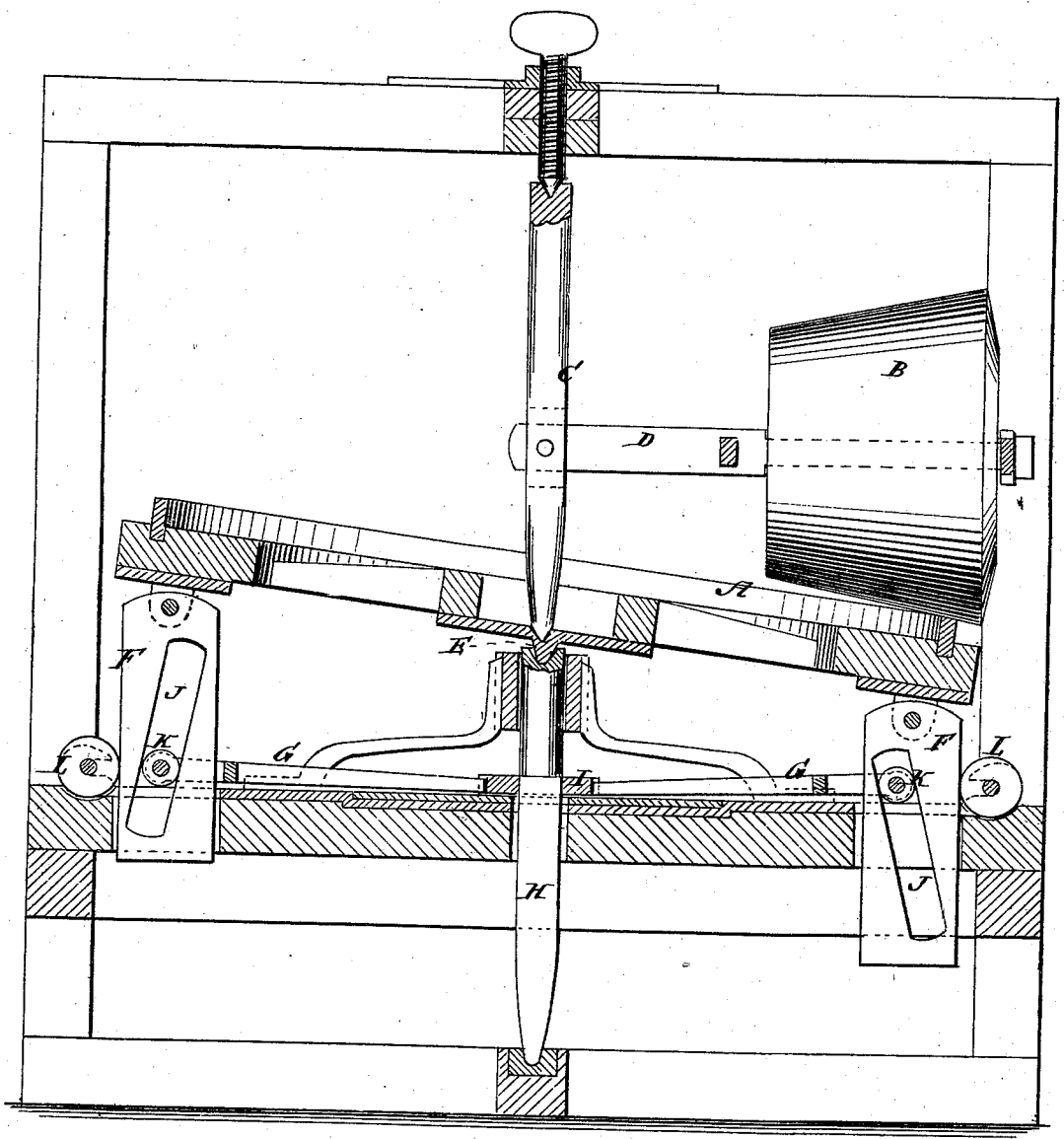

UNITED STATES PATENT OFFICE.

PHILLIP B. GREENE, OF CENTERVILLE, IOWA.

IMPROVEMENT IN MOTIVE POWERS.

Specification forming part of Letters Patent No. 166,271, dated August 3, 1875; application filed May 28, 1875.

*To all whom it may concern:*

Be it known that I, PHILLIP B. GREENE, of Centerville, Appanoose county, Iowa, have invented a new and Improved Tilting Circular and Animal-Power Platform, of which the following is a specification:

My invention consists of a circular platform fixed to tilt on a center-pivot by the weight of a horse, and a heavy roller, which he draws around a track at the margin of the upper side, to the under side of which platform are attached a number of hanging cam-plates, which by rising and falling with the platform actuate pawls, which give continuous rotary motion to a vertical shaft or spindle by means of a ratchet-wheel on it, in which the pawls work in succession as the platform is depressed and raised.

Figure 1 is a sectional elevation of my improved horse-power, taken on the line $x\ x$; and Fig. 2 is a horizontal section.

Similar letters of reference indicate corresponding parts.

A is the circular platform, on which is a heavy roller, B, turning on an axle, D, connected to the vertical shaft C to be drawn around the platform by a horse traveling on it for tilting the platform on the pivot E, to work the cam-plates F, suspended from the under side to work the pawls G, and rotate the shaft H by the ratchet-wheel I, the said shaft being to give motion to the machine to be driven by means of gearing of any kind. The cam-plates have an inclined cam-slot, J, in which the pawls are connected by a roller, K, and behind each cam-plate is a roller, L, to lessen the friction. The pawls are kept in contact with the ratchet-wheel by springs M.

Having thus described my invention, I claim as new and desire to secure by Letters Patent—

1. The combination of the tilting platform A, roller B, cam-plates F, pawls G, ratchet-wheel I, and shaft H, substantially as specified.

2. The shaft C, arm D, roller B, and tilting platform A, substantially as specified.

PHILLIP B. GREENE.

Witnesses:
 W. S. JOHNSON,
 W. BRAND.